United States Patent Office 3,369,021
Patented Feb. 13, 1968

3,369,021
PREPARATION OF LUBRICANT ADDITIVES
WITH REDUCED ODOR
William M. LeSuer, Cleveland, Ohio, assignor to The Lubrizol Corporation, Wickliffe, Ohio, a corporation of Ohio
No Drawing. Filed Mar. 7, 1966, Ser. No. 532,088
6 Claims. (Cl. 260—268)

ABSTRACT OF THE DISCLOSURE

Dispersants for use in lubricants are prepared by reacting the reaction product of a hydrocarbon-substituted succinic acid-producing compound (e.g., an acid, acid halide or anhydride) and a polyalkylene polyamine with a lower aliphatic aldehyde or reversible polymer thereof. Preferably, about 0.05–1.0% (calculated on the weight of the acid-amine intermediate) of the aldehyde or aldehyde polymer is used; the product has substantially no amine odor, as compared with the acid-amine intermediate which has a distinct odor.

---

This invention relates to novel compositions of matter and methods for their preparation, and more particularly to an improved class of metal-free compositions suitable for use as dispersant additives in lubricating oils.

It is well known that certain basic compositions of matter containing metals, especially alkaline earth metals such as barium and calcium, are useful as detergents and dispersants for lubricating oils. However, such compositions are often undesirable because they decompose to deposit oil-insoluble ash in the engine, with consequent damage to engine parts. To avoid this damage, it is of continuing interest to develop low-ash and ashless detergents or dispersants.

The reaction products of polyalkylene polyamines with high molecular weight hydrocarbon-substituted succinic acids constitute a valuable class of ashless detergent additives. These substances are widely used in lubricating oils, but many of them encounter an adverse reaction from consumers because they have a strong amine odor. Thus, it is of interest to eliminate the amine odor from these materials while at the same time, if possible, maintaining or increasing their effectiveness as detergents and dispersants.

A principal object of the present invention, therefore, is to prepare compositions of matter which are suitable for use as dispersants in lubricating oils.

A further object is to provide odorless compositions of the hydrocarbon succinic acid-polyamine type.

A further object is to improve the dispersant characteristics of compoistions formed by the reaction of hydrocarbon substituted succinic acids with polyalkylene polyamines.

Still another object is to provide an improved method for the preparation of dispersant additives.

Other objects will in part be obvious and will in part appear hereinafter.

Accordingly, the present invention consists of a method for preparing a lubricant additive composition, and the composition so prepared, said method comprising reacting, at about 50–175° C., in a liquid medium, a mixture of (A) a reaction product of a polyalkylene polyamine with a succinic acid-producing substance containing a hydrocarbon substituent with at least about 50 carbon atoms and (B) a lower aliphatic aldehyde or reversible polymer thereof.

Reaction products of hydrocarbon-substituted succinic acids with polyamines are described in U.S. Patent 3,219,-666. A critical aspect of these compositions is the size of the hydrocarbon substituent. Only compositions having at least about 50 aliphatic carbon atoms in the hydrocarbon substituent are contemplated as being useful for the present invention. Furthermore, this substituent preferably should be substantially saturated, i.e., at least 95% of the total number of carbon-to-carbon bonds are single bonds. Finally, this substituent should be substantially free from large oil-solubilizing radicals, i.e., radicals having more than about six aliphatic carbon atoms. While such radicals may be present, they should preferably occur in proportions less than about one for every 25 aliphatic carbon atoms in the main hydrocarbon chain. The substituent may contain polar groups, provided that they are not present in proportions sufficiently large to alter significantly the hydrocarbon character of the radical. The upper limit with respect to the proportion of such polar substituents is approximately 10 percent based on the molecular weight of the hydrocarbon radical.

The sources of the hydrocarbon substituent include principally the high molecular weight substantially saturated petroleum fractions and olefin polymers, particularly polymers of mono-olefins having from about 2 to about 30 carbon atoms. Especially useful are the polymers of 1-olefins such as ethylene, propene, 1-butene, isobutene, 1-octene and the like. Also useful are the interpolymers of such olefins with other interpolymerizable olefinic substances such as aromatic olefins, cyclic olefins and polyolefins. Thus, the interpolymers contemplated for use should be substantially aliphatic and substantially saturated, i.e., they should contain at least about 80% and preferably at least about 95% on a weight basis of units derived from the aliphatic mono-olefins. The use of olefin polymers having a molecular weight of about 750–5000 is preferred. The substituted succinic acid-producing substance may be an acid, anhydride or acid halide. The acids and anhydrides are prepared by reacting maleic acid or anhydride with a high molecular weight olefin or chlorinated hydrocarbon such as the olefin polymer described hereinabove. Reaction takes place when the two reactants are heated to about 100–200° C. The acid or anhydride may then be converted to an acid halide by reaction with an active halogen compound such as phosphorus pentachloride or thionyl chloride.

The alkylene polyamines are preferably those containing up to about 10 amino groups. These groups are linked by means of alkylene radicals, preferably lower alkylene radicals having less than about 8 carbon atoms. The ethylene amines are especially useful; typical ethylene amines are available either pure or in the form of mixtures containing an average of about 3–7 amino groups per molecule. Hydroxyalkyl-substituted alkylene amines, i.e., alkylene amines having one or more hydroxyalkyl substituents on the nitrogen atoms, may also be used.

The reaction between the polyamine and the succinic acid-producing substance is carried out by heating a mixture of the two to a temperature above 80° C., preferably about 100–250° C. The use of a solvent such as benzene, toluene, naphtha, mineral oil, xylene, n-hexane or the like is often desirable to facilitate control of the reaction temperature. The relative proportions of the reactants are such that at least about one-half of the stoichiometrically equivalent amount of polyamine is used for each equivalent of the succinic acid compound.

The product obtained by the reaction described above is probably a mixture of substituted succinamides (both mono- and diamides probably being present) and succinimides. For the sake of brevity, the product is sometimes referred to hereinafter as the "amide"; this term is, however, not to be construed as further limiting the present invention to the use of a reactant of any specific single molecular structure.

According to this invention, the amide is further reacted with a lower aliphatic aldehyde or reversible polymer thereof. The term "lower aliphatic," when used in this specification, refers to aliphatic aldehydes containing about 4 carbon atoms or less. These include such compounds as formaldehyde, acetaldehyde, propionaldehyde, butyraldehyde, crotonaldehyde and the like; also included are polyfunctional aldehydes such as glyoxal. The term "reversible polymer" refers to substances formed by polymerization of aldehydes but easily convertible to the monomeric aldehyde by heat, acid treatment or the like. Typical examples are trioxane, paraformaldehyde, and paraldehyde.

The relative proportions of amide and aldehyde in the reaction mixture are subject to wide variation, depending on the extent of modification desired. If the sole purpose for aldehyde treatment is odor suppression, as little as 0.01% of the aldehyde and preferably about 0.05–1.0%, based on the weight of the amide, may be used. On the other hand, if it is desired to modify the dispersant properties of the composition, a larger amount will be used—up to about 2–3 equivalents of aldehyde per equivalent of amide. Expressed in terms of percentage of amide, the aldehyde may comprise about 0.01–15%.

In order to promote efficient contact of the reactants, it is essential that the reaction be effected in a liquid medium. Thus, if a solid reactant such as paraformaldehyde is employed the reaction must be carried out at a temperature sufficiently high to melt it or cause it to dissociate into its monomeric components, or else to employ a solvent. Formaldehyde is most conveniently employed as an aqueous solution. Other aldehydes and polymers thereof, which are liquids at room temperature, may be used without the aid of solvents.

The reaction may be carried out at a temperature between about 50° and 175° C. preferably about 70–110° C. After the reaction is complete, water and solvents may be removed by stripping (usually at reduced pressure) at temperatures up to about 175° C.

The structures of the compositions of this invention are not known. It is believed that a condensation reaction takes place between free amino groups and the aldehyde, but the exact nature of the product has not been determined.

Of the following examples, Examples 1–6 describe the preparation of amide starting materials and lubricant additive concentrates, and Examples 7–12 illustrate the method of the present invention. All parts are by weight.

Example 1

To a solution of 561 parts of a polyisobutenyl (molecular weight about 850–1000) succinic anhydride in 414 parts of mineral oil, at 60° C., is added 61.8 parts of mixed polyethylene polyamines (containing an average of about 3–7 amino groups per molecule) over one hour. The equivalent weight ratio of acid to amine in the mixture is 1:1.5. The heat of reaction raises the temperature in the reaction vessel to 82° C. during the amine addition. The reaction mixture is then heated to 150° C. over 5 hours and is blown with nitrogen for 5 hours at that temperature. Ten parts of a filter aid material is added and the mixture is filtered, yielding an oil solution containing 2.04% nitrogen.

Example 2

Following substantially the procedure of Example 1, 1258 parts of polyisobutenyl succinic anhydride is reacted with 190 parts of an ethylene polyamine mixture (1:2 equivalent weight ratio of acid to amine) in 946 parts of mineral oil. After blowing with nitrogen, the oil solution is drained to storage vessels. The product contains 2.69% nitrogen.

Example 3

A product similar to that of Example 1 is prepared by reacting 336 parts of polyisobutenyl succinic anhydride with 37 parts of polyethylene polyamine mixture and 248 parts of mineral oil at 120–150° C. The oil solution is filtered, and 9.3 parts of terephthalic acid is added over 5 minutes at about 155° C. The mixture is agitated for 30 minutes at that temperature, after which 10 parts of filter aid is added and the mixture is filtered. There is obtained 604 parts of a product containing 2.03% nitrogen.

Example 4

Acrylonitrile, 318 parts, is fed to a reaction vessel containing 330 parts of polyethylene polyamine mixture similar to that used in Examples 1–3. The acrylonitrile addition takes 4 hours; the reaction is highly exothermic and the vessel must be cooled with cold water to maintain the temperature between 40° and 50° C. The reaction mixture is agitated for 2 hours at about 50–52° C. and is then heated under reflux for 2 hours. Finally, the mixture is blown with nitrogen at 130° C.

The acrylonitrile-amine reaction product thus obtained is dissolved in 235 parts of mineral oil and the solution is heated to about 70° C. Polyisobutenyl (molecular weight about 850–1000) succinic anhydride, 2970 parts, is added over 3 hours at 70–75° C., the reaction vessel being cooled with water during the slightly exothermic reaction. The mixture is heated to 150° C. and blown with nitrogen for 5 hours, and then 90 parts of filter aid is added and the oil solution is filtered. The product (yield 5580 parts) contains 3.0% nitrogen.

Example 5

A reaction product similar to the product of Example 1 is prepared from 3300 parts of polyisobutenyl succinic acid, 1650 parts of mineral oil, and 282 parts of polyethylene polyamine mixture. After the reaction is completed just prior to filtration, 1056 parts of mineral oil and 25 parts of filter aid are added, and the solution is filtered. The product has a nitrogen content of 1.5%.

Example 6

An additive concentrate for lubricating oils is prepared by mixing the following ingredients (all percentages are by weight).

Product of examples: | Percent
1 _____ 54.95
3 _____ 15.0
4 _____ 15.15
5 _____ 14.90

A marked amine odor is noticeable in the concentrate.

Example 7

The product of Example 2 (referred to as "amide" in the table) is heated under reflux with 37% aqueous formaldehyde solution for 3 hours, with stirring. Water is removed by vacuum distillation at 75–150° C.; the products are dark brown, viscous liquids. The following table gives reactant amounts and ratios, and analyses of the various products.

| Product No. | Weight, g. | | Formaldehyde content as wt. percent of amide | Eq. wt ratio, amide: formaldehyde | Percent nitrogen (by wt.) |
|---|---|---|---|---|---|
| | Amide | Formaldehyde (anhydrous basis) | | | |
| 7A | 1,110 | 90 | 8.1 | 1:1.5 | 2.46 |
| 7B | 900 | 48.6 | 5.4 | 1:1 | 2.43 |
| 7C | 1,110 | 30 | 2.7 | 1:0.5 | 2.51 |
| 7D | 1,110 | 12 | 1.1 | 1:0.2 | 2.53 |

Example 8

A portion of the additive concentrate of Example 6 is heated with 0.5% of its weight of 40% aqueous formaldehyde solution at 100–105° C. for one hour; the mixture is then blown with nitrogen for one hour at 100–105° C. to remove water. The product is free of any amine odor.

Example 9

A portion of the additive concentrate of Example 6 is heated with 0.05% of its weight of paraldehyde at 145–155° C. for one hour, with stirring. The product is free of amine odor.

A similar result if obtained by heating the concentrate with 0.1% paraldehyde at 150° C. for one hour.

Example 10

Samples of the product of Example 1 are heated for 1½ hours with paraformaldehyde at 80–105° C. The products, after filtration, are dark brown viscous liquids. The compositions of the various reaction mixtures are given in the following table.

| Prod. No. | Weight, g. | | Formaldehyde content as wt. percent of amide | Eq. wt. ratio, amide: formaldehyde |
| --- | --- | --- | --- | --- |
| | Amide | Paraformaldehyde | | |
| 10A | 260 | 4.65 | 1.8 | 1:0.33 |
| 10B | 260 | 9.30 | 3.6 | 1:0.67 |
| 10C | 260 | 15.31 | 5.9 | 1:1.1 |

Example 11

Crotonaldehyde, 188 grams, is added over 1 hour to 2854 grams of the product of Example 2 at room temperature, with stirring. The mixture is heated to 120–155° C. and blown with nitrogen for 5 hours, during which time 38 ml. of water is evolved. Mineral oil, 84 grams, is added to the product to yield a liquid containing 2.48% nitrogen.

Example 12

Following the procedure of Example 11, 2000 grams of the product of Example 2 is reacted with 181 grams of glyoxal (as a 30% aqueous solution). Mineral oil, 33 grams, is added to the mixture after removal of water and the composition is filtered. The nitrogen content of the product is 2.49%.

The compositions of this invention are excellent dispersant additives for lubricating and fuel oils; they are normally used in such oils in amounts between about 0.1% and 10% by weight. They are substantially odorless, and their dispersant properties are at least substantially equal to and in many aspects superior to those of the unmodified amides. The following tests show the effectiveness of the compositions of this invention as dispersant additives for lubricants.

In the "Panel Coker Test," a reservoir of oil containing the dispersant being tested is agitated violently so that oil is splashed onto an aluminum panel suspended above the reservoir and heated to 475° F. Agitation of the oil occurs in 13-minute cycles, each cycle being followed by a two-minute pause. The test continues for three hours, after which the panels are rated between 0 and 10.0 by visual inspection of the deposits thereon. A panel completely free of deposits is rated at 10.0, while a rating of zero indicates complete coverage of the panel by deposits.

In the following table are reported "Panel Coker" results on a number of the compositions of this invention, compared with the product of Example 2 as a control. The tests were run on a Mid-Continent oil containing 3% by weight of the composition being tested and 0.3% 4,4'-methylenebis (2,6-di-t-butylphenol) as an antioxidant.

Sample, product of examples: Rating
2 (control) _____ 2
7A _____ 5
7B _____ 7
7C _____ 4
7D _____ 3

Dispersant properties of the compositions of this invention are further evaluated by means of the "Enarco Air Oxidation Test." In this test, a 350 cc. lubricant sample consisting of a Mid-Continent, conventionally refined lubricating oil having a viscosity of 200 SUS at 100° F. and containing 1.5% by weight of the additive being tested is placed in a 2 x 15 inch borosilicate tube. A 1⅜ inch by 5⅞ inch SAE 10–20 steel panel is immersed in the oil. The sample is then heated at 300° F. for 96 hours while air is bubbled through the oil at a rate of 10 liters per hour. The oxidized sample is cooled to 120° F., mixed with 0.5% by weight of water, homogenized, allowed to stand at room temperature for 24 hours and then filtered through two layers of No. 1 Whatman filter paper at a pressure of 20 mm. of mercury. The precipitate is washed with naphtha and dried. The weight of the precipitate, adjusted to milligrams per 100 cc. of oil tested, is taken as a measure of the effectiveness of the dispersant additive, i.e., the greater the weight of the precipitate the less effective the additive. The amount of deposit on the steel panel is evaluated on a scale from 0 to 10, by a method similar to that used in the "Panel Coker Test" described above. When tested by this method, and compared with the composition of Example 2 as control, the compositions of this invention give the following results.

| Sample | Ppt. wt., mg. | Panel Rating |
| --- | --- | --- |
| Product of Example 2 (control) | 4 | 8 |
| Product of Example 7A | 6 | 9 |

These results show that the composition of Example 7A is comparable to that of Example 2 in dispersant properties as evaluated by the Enarco Test. In view of the fact that precipitate weights according to this test are often as high as 50 milligrams, it will be seen that the compositions of this invention are excellent dispersants.

The effectiveness of the compositions of this invention as dispersants in fuel oils is evaluated by means of the Sundstrand Pump Tests. In this test, oil containing a weighed amount of synthetic sludge is circulated by means of a Sundstrand fuel oil burner thru a 100 mesh Monel strainer. The amount of sludge retained is collected in a tared fritted glass filter of medium porosity. The synthetic sludge is made by emulsifying a mixture of 50% distilled water, 40% No. 2 uninhibited fuel oil and 10% lampblack. When it has formed a sludge of mayonnaise consistency, it is added to the fuel oil which is then run through the Sundstrand burner as described. After the test, the strainer is placed in a beaker and the sludge is washed off with acetone, filtered and weighed. A blank is run, using a fuel with no dispersant additive. The percentage reduction in screen deposit weight afforded by use of the dispersant is then calculated. The results are given below for several of the compositions of this invention, compared with a control consisting of the product of Example 2.

Sample, product of examples: Percent deposit reduction
2 (control) _____ 98.1
7B _____ 98.4
7C _____ 98.6
7D _____ 98.8

What is claimed is:
1. A method for removing odor from a composition of matter suitable for use as a lubricant additive which comprises reacting at about 50–175° C., in a liquid medium, a mixture of (A) a reaction product of an alkylene polyamine with a succinic acid, acid halide or anhydride containing a hydrocarbon substituent having at least about 50 carbon atoms and (B) about 0.05–1.0%, by weight of component A, of a lower aliphatic aldehyde or reversible polymer thereof.

2. The method of claim 1 wherein component B is formaldehyde, acetaldehyde or a reversible polymer thereof.

3. The method of claim 2 wherein component B is a reversible polymer of formaldehyde.

4. The method of claim 2 wherein component B is a reversible polymer of acetaldehyde.

5. A composition prepared according to the method of claim 3.

6. A composition prepared according to the method of claim 4.

References Cited

UNITED STATES PATENTS

| | | | |
|---|---|---|---|
| 2,877,179 | 3/1959 | Hughes | 260—309.7 |
| 3,219,666 | 11/1965 | Norman et al. | 252—51.5 X |
| 3,280,034 | 10/1966 | Anzenberger et al. | 252—51.5 |
| 3,312,619 | 4/1967 | Vineyard | 252—51.5 X |

FOREIGN PATENTS

| | | |
|---|---|---|
| 985,373 | 3/1965 | Great Britain. |
| 641,287 | 3/1965 | Netherlands. |

DANIEL E. WYMAN, *Primary Examiner.*

PATRICK P. GARVIN, *Examiner.*